May 3, 1932. F. C. LANGENBERG 1,856,874
MANUFACTURE OF CENTRIFUGAL PIPE MOLDS
Filed Feb. 4, 1930
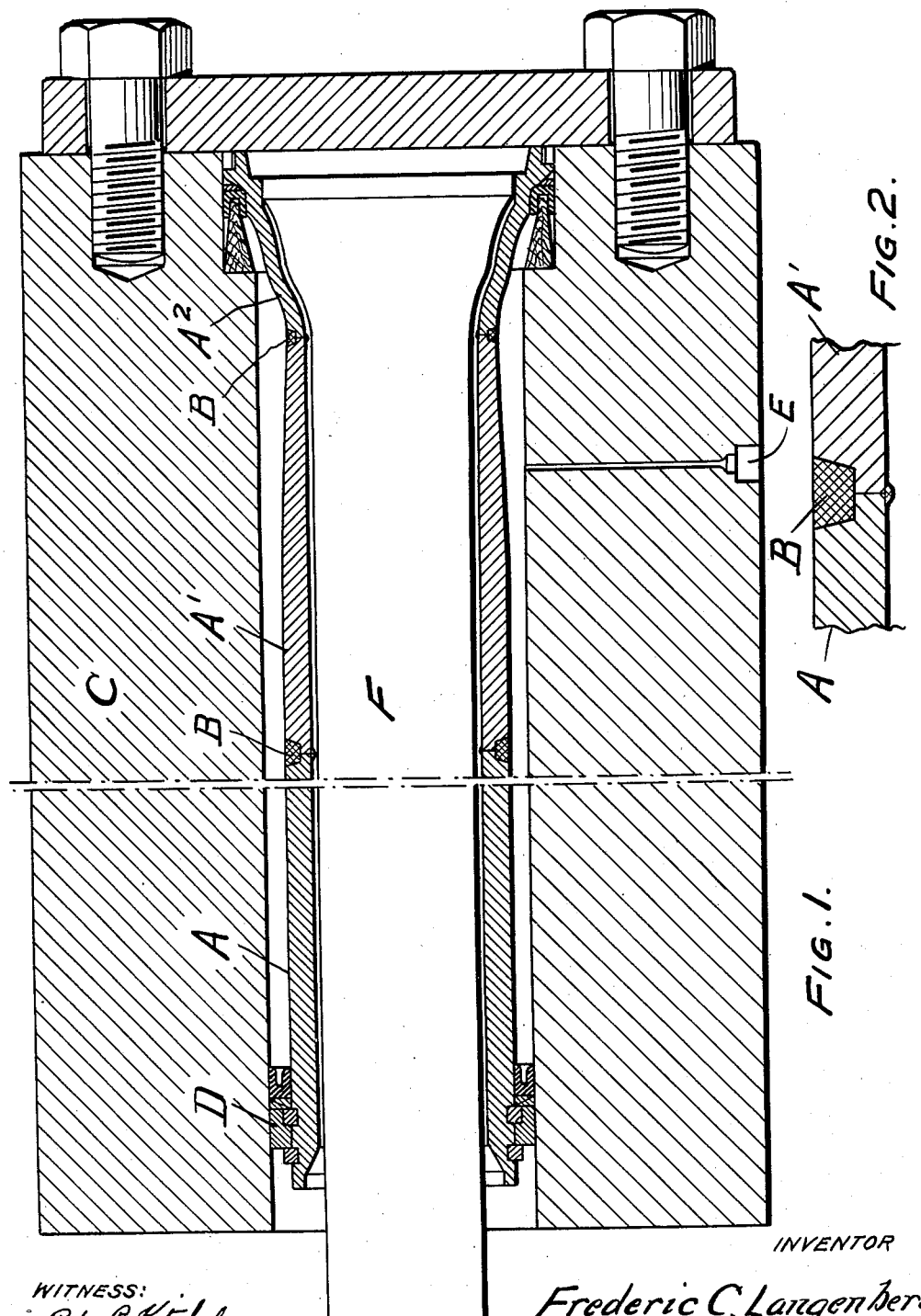
INVENTOR
Frederic C. Langenberg
BY
ATTORNEY.
WITNESS:

Patented May 3, 1932

1,856,874

UNITED STATES PATENT OFFICE

FREDERICK C. LANGENBERG, OF EDGEWATER PARK, NEW JERSEY, ASSIGNOR TO UNITED STATES PIPE & FOUNDRY COMPANY, OF BURLINGTON, NEW JERSEY, A CORPORATION OF NEW JERSEY

MANUFACTURE OF CENTRIFUGAL PIPE MOLDS

Application filed February 4, 1930. Serial No. 425,763.

My invention relates to centrifugal pipe molds such as are used in the centrifugal casting of cast iron pipes and has for its object to provide a method whereby such molds can be manufactured from two or more sections welded together at their ends so as to form a continuous mold the metal of which will be of such uniform hardness and density as is necessary to provide a serviceable mold.

Molds of the kind in question, particularly those intended for use in the manufacture of bell ended pipes, have usually one end of larger diameter than the other and it has long been recognized that considerable economy in the manufacture of such molds could be effected by forming the cylindrical body of the mold and enlarged end of separate forgings or castings and uniting them together but where such unions have been effected by mechanical means they have failed in use by reason of the uneven expansion of the united parts and where the union has been effected by welding the metal of the weld and adjacent parts is so altered in hardness and density as to differ materially from the hardness and density of the remainder of the mold, the difference being so great as to materially affect the service of the mold. My invention depends upon my discovery that if after uniting the mold parts by a welded joint they are subjected to external hydraulic pressure in sufficient amount to produce a symmetrical radial contraction of the portion of the mold embracing the welded joint that the cold working of the metal will eliminate differences in hardness and density and produce a serviceable mold. This method of manufacturing molds out of two or more sections is applicable not only to the union of a cylindrical portion with a bell end or end of enlarged diameter but also to the union of cylindrical parts to produce therefrom molds of increased length.

My invention will be better understood by a reference to the drawings in which

Figure 1 illustrates a mold formed by the welded union of three sections and an apparatus adapted for the cold working of the welded mold by subjecting it to external radial pressure sufficient to cause a symmetrical radial contraction of the portions of the mold in which the welded joints occur, and Figure 2 is a sectional view illustrating on a larger scale my preferred method of forming the weld between abutted mold sections.

The mold as shown is made up of three portions indicated at A, A¹ and A² and by preference these portions are welded together by butt or flash welds indicated at B, formed between portions of reduced diameter and an arc weld formed by melting the steel in the circumferential annulus formed in the metal of the abutting mold sections immediately above the butt weld. The mold, prepared as described, is then inserted in a container C with a mandrel F of less diameter than the interior of the mold and of the form and dimension desired for the complete forging, the mold being anchored to the end of the container at its bell or enlarged end and provided with a packing at its other end which will prevent the escape of fluid between the mold and the container and permit such longitudinal expansion of the mold as is incident to its radial contraction. The packing is indicated at D. Fluid under pressure is then admitted to the container as through a port E, the pressure being sufficient to cause the radial contraction of the welded molds upon the mandrel, as a result of which it is found that the differences in density and hardness between the welds and adjacent parts and the body portions of the mold are eliminated and a mold is produced of excellent serviceable qualities and durability.

I have found that with a mold of 7 inches internal diameter and a wall thickness of 1 inch a pressure of 30,000 pounds per square inch is sufficient to bring about the desired radial contraction and I have also found that a contraction of .125 of an inch is sufficient to bring about the desired changes in hardness and density.

The cold working of cylindrical bodies to improve the texture of the metal and the formation or reclammation of used molds by subjecting them to external fluid pressure sufficient to produce a radial contraction and simultaneous longitudinal expansion forms the subject matter of the pending applications filed by me on December 29, 1928, Serial Numbers 329,189 and 329,208. My present invention depends, as I have already stated, upon my discovery that difficulties heretofore met with in forming molds of abutted welded sections can be eliminated by subjecting such welded molds to the process described in my said pending applications.

Having now described my invention, what I claim as new and desire to secure by Letters Patent, is:

1. The method of manufacturing a steel mold for the centrifugal casting of pipes which consists in forming separate longitudinal sections adapted when united to form a mold, uniting said sections end to end by welded joints and then eliminating injurious variations in the hardness and density of the metal of the mold due to the formation of the welded joints by subjecting the welded mold to external fluid pressure sufficient in amount to effect a permanent radial contraction of the mold.

2. The method of claim 1 as applied to the formation of a mold from a cylindrical section and an end section of similar diameter at the point of welded union and thereafter of increased diameter.

3. The method of claim 1 in which the welded union of the mold sections is formed in part by a flash weld between abutted portions of reduced diameter and partly by an arc weld fusing metal in the annular chamber formed in reducing the diameter of the abutted ends of the sections.

FREDERICK C. LANGENBERG.